July 8, 1958
W. A. LEBUS
2,841,926
KNIFE SHARPENER CASING
Filed May 6, 1954
2 Sheets-Sheet 1
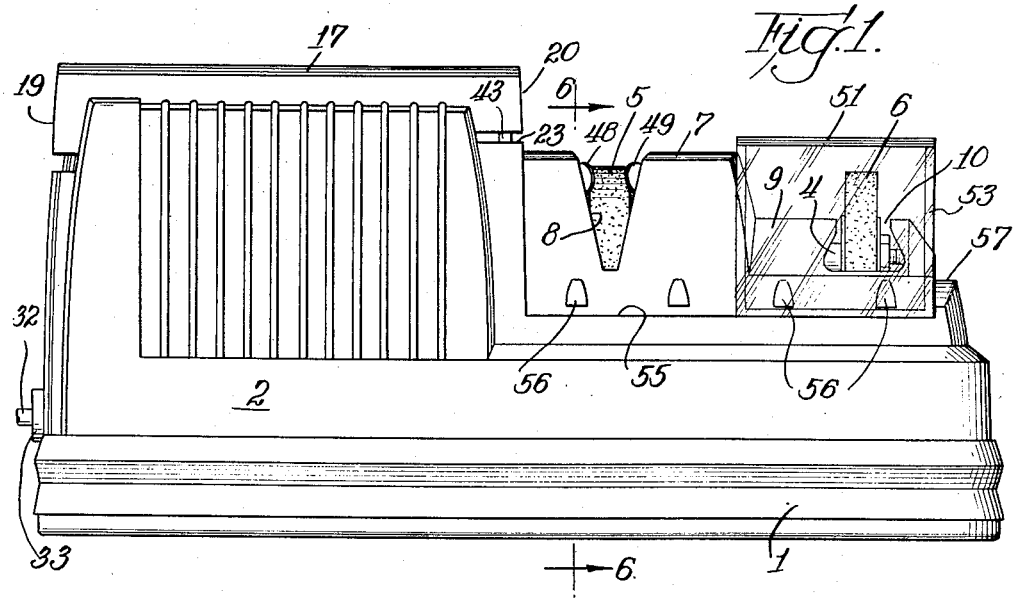
INVENTOR.
William A. Lebus
BY
Watson D. Harbaugh
Atty.

July 8, 1958 W. A. LEBUS 2,841,926
KNIFE SHARPENER CASING
Filed May 6, 1954 2 Sheets-Sheet 2
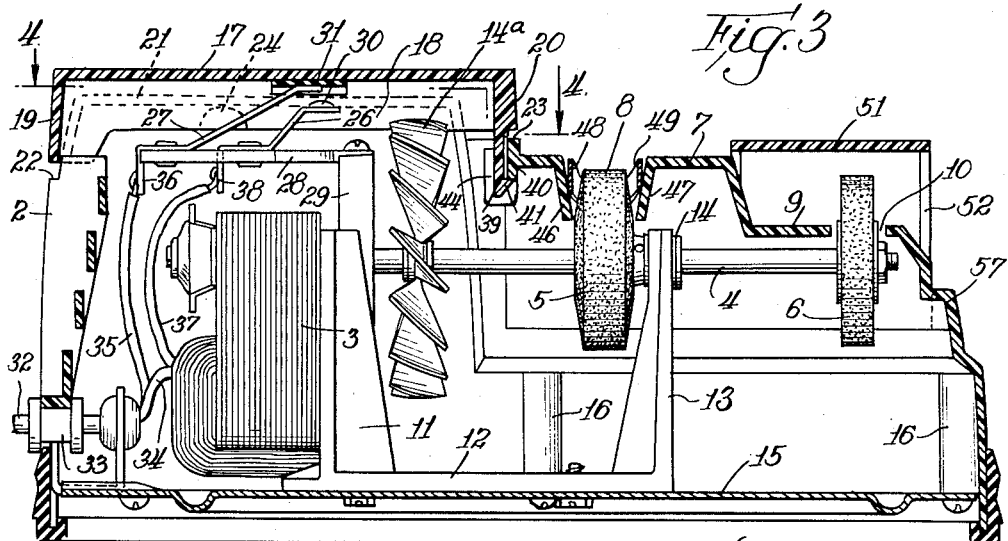
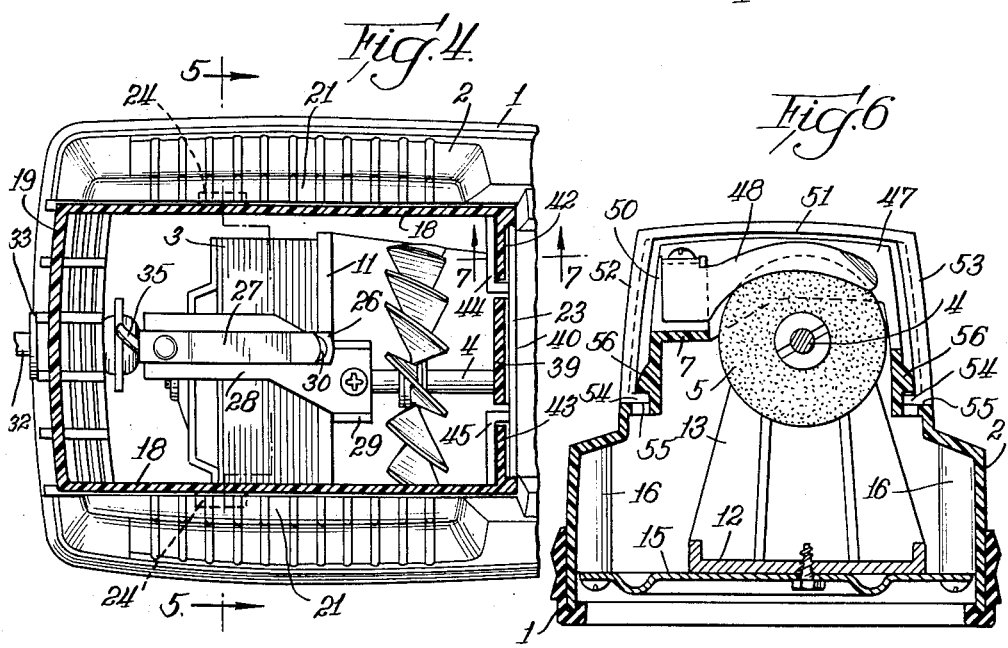
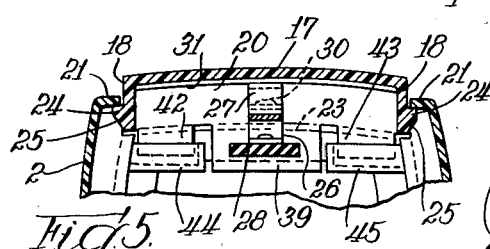
INVENTOR.
William A. Lebus
BY
Watson D. Harbaugh
Att'y

United States Patent Office 2,841,926
Patented July 8, 1958

2,841,926

KNIFE SHARPENER CASING

William A. Lebus, Riverside, Ill., assignor, by mesne assignments, to Supreme Products Corporation, Chicago, Ill., a corporation of Illinois Application May 6, 1954, Serial No. 428,068

14 Claims. (Cl. 51—5)

This invention relates to electric motor driven grinding and buffing devices wherein the working elements are mounted on a shaft extension of an electric motor and the assembly is housed within a unitary casing; and particularly to such devices arranged as a combination knife sharpener and a buffer for use as a domestic or household appliance and having a movable portion of the casing wall which actuates a circuit closing contact means for controlling the motor operation.

The main objects of this invention are to provide an improved housing or casing construction for grinding wheels and the like of domestic utility; to provide an improved arrangement and construction for the portion of such housings or casings which serves as a manually operable contact actuating means for starting or stopping the electric motor; to provide such a device having an improved movable top wall construction for actuating a motor control contact means by manual pressure; and to provide an improved knife sharpener casing top wall construction that is operable to actuate an electric circuit closing contact means by the application of manual pressure at substantially any place on the movable wall area.

Further objects of this invention are to provide an improved knife sharpener and buffing wheel assembly for use as a domestic appliance; to provide an improved form and construction for the housing of such an assembly; to provide such a device having an improved motor enclosure including a shiftable top wall adapted for limited inward and outward movement for operating a motor control circuit closing contact means; to provide an improved motor casing for such devices having a rigid unitary top wall capable of limited inward and outward movement and which is self retained in the casing assembly; to provide an improved housing for a combination knife sharpener and buffing wheel wherein one only of the operating elements is exposed at any one time; and to provide such a housing having a slidable cover member attached thereto and operable to enclose selectively one or the other of the operating elements when the device is in use.

A specific embodiment of this invention is shown in the accompanying drawings in which:

Fig. 1 is a side elevational view of a combination knife sharpener and buffer appliance for domestic use and embodying my improved housing construction;

Fig. 2 is a top plan view of the same;

Fig. 3 is a sectional elevation of the same as taken on line 3—3 of Fig. 2, showing the arrangement of the enclosed mechanism;

Fig. 4 is a fragmentary plan view of the motor enclosure portion of the housing, partly in section, as taken on line 4—4 of Fig. 3;

Fig. 5 is a fragmentary vertical sectional view of the housing top wall as taken on line 5—5 of Fig. 4;

Fig. 6 is a vertical sectional view of the housing as taken on line 6—6 of Fig. 1, to show the arrangement of the sliding cover member for selectively exposing one or the other of the grinding and buffing wheels; and Fig. 7 is an enlarged sectional detail of the connection between one end of the movable top wall member and the housing body, as taken on line 7—7 of Fig. 4.

In the form shown the invention is embodied in a combined knife sharpener and buffer mounted in a unitary housing arranged for table top use; the motor being contained in one end of the housing and the grinding wheel and buffing wheel being mounted on a horizontal shaft extension of the motor which projects toward the other end of the housing; and the housing structure being arranged to partially enclose the grinding and buffing wheels so as to expose only the portions thereof necessary for performing the grinding and buffing functions.

As shown in Figs. 1 and 2 and 3 the housing is a hollow structure comprising a ring-like base member 1 of substantially rectangular form on which is mounted a molded shell or casing 2 made of any suitable dielectric plastic material. One end of this shell is of box-like form adapted to enclose or house a motor unit 3, which has a horizontal shaft extension 4 projecting toward the opposite end of the shell and carrying a grinding wheel 5 and a buffing wheel 6 in axially spaced relation. The motor enclosing portion of the housing extends for substantially one-half its length and the remainder of the housing is formed in two steps of progressively decreasing height. The first step 7 substantially encloses the grinding wheel 5 and is provided with an opening 8, which extends across its top wall and down each side wall, for operational access to the grinding wheel as will be later described. The second step 9 is of a height sufficient to enclose only about two-thirds of the buffing wheel 6 and like the first step has an opening 10 through which the buffing wheel projects for about one-third its diameter.

As shown in Fig. 3, the motor unit is mounted on one leg 11 of an upright U-shaped bracket 12, the motor shaft 4 extending horizontally through the opposite leg 13 of the bracket in which the shaft is journalled in a suitable bearing 14. Preferably, as shown in the Fig. 3, the leg 13 of the mounting bracket is disposed on the outward side of the grinding wheel 5 to provide adequate support for the grinding wheel and the outward end of the shaft extension 4 while a fan 14a is mounted on the shaft between the wheel 5 and leg 11; and the bracket 12 is in turn fixedly mounted on a base plate 15, which is secured to suitable bosses 16 formed on the inside margins of the housing 2, and which serves as a bottom closure therefor.

In the form shown, the box-like motor enclosing portion of the unitary housing structure 2 is substantially rectangular, in horizontal section, and is entirely open on its top side where a cover member 17 is mounted to serve as a top wall and closure for the motor chamber. The cover member or top wall 17 is a rigid unitary cap-like element, rectangular in shape to fit the top opening of the housing, and is provided with depending side flanges 18, and end flanges 19 and 20 which coact with the margins of the housing opening to hold the cover in place. As shown in Figs. 3, 4 and 5 the side walls of the motor chamber of the housing 2 extend to a greater height than the end walls thereof and the cover plate or top wall 17 sets into the top opening with its side flanges 18 projecting below the inturned marginal flanges or lips 21 of the side walls. The end flanges 19 and 20, however, abut edgewise on the transverse shoulders 22 and 23, respectively, which define the ends of the motor section opening and limit the inward movement of the cover, as shown in Fig. 3.

Normally the cover member 17 is urged upwardly by suitable spring means, which in the arrangement shown is one of the contact elements of the motor circuit closing means as will be later described, and in order to retain the cover member on the housing an outwardly projecting lug or trunnion 24 is provided on each of the cover side flanges 18 to engage the bottom surfaces of the sidewall lips 21. These lugs 24 are axially aligned with each other and semicircular on their upper sides, as indicated in Fig. 3, and are also inwardly beveled at their outer ends as shown at 25 in Fig. 5, in order that they may be sprung past the lips 21 when the cover is applied to the housing. As shown in Fig. 3, the lugs or trunnions 24 are located adjacent the lower edges of the flanges 18 so that the spring means, urging the cover 17 outwardly, will hold the cover upwardly spaced from the shoulders or abutments 22 and 23, and thereby permit limited inward and outward movement of the cover relative to the housing body for operation of a motor control contact means.

In the form shown, the contact means comprises a pair of cantilevered resilient arms 26 and 27, mounted on and extending angularly upward from a bracket 28 attached to the upper end 29 of the leg 11 which carries the motor 3. The bracket 28 is preferably of dielectric material and the arms 26 and 27 are secured directly thereto, in alignment with each other and the center line of the housing 2, and in spaced substantially parallel inclined position, the free ends of the arms being turned to horizontal position and in vertically spaced relation. The free end of the lower contact arm 26 is provided with a contact 30 on its upper surface and is spaced slightly forward of the free end of the upper arm 27, which is located to engage the inside of the cover plate 17 substantially at the center of its area and the relation is such that when the arm 27 is depressed, by inward movement of the cover plate, its free end will swing downward and forward to squarely engage the contact 30. The arm 27 is made from a stiffy resilient conductor material, such as phosphor bronze, and serves as the spring means for normally urging the cover member 17 outwardly from the housing 2, the free end of the arm 27 bearing against a strip 31 of suitable hard wearing insulating material and pressing the cover member upwardly until the lugs 24 engage the housing sidewall lips 21. Thus the cover member or plate 17, upon being manually pressed inwardly or downwardly, will depress the spring arm 27 until it engages the contact 30 whereupon an electric circuit will be closed to energize the motor 3 and drive the shaft 4.

Electric power for the motor 3 is brought into the housing 2 by means of a two wire conductor cord 32 which enters the housing through a suitable bushing 33 at the bottom of the rear end wall. The conductor leads 34 and 35, inside the housing are connected to one side of the motor winding and to a terminal 36 for the spring arm 27, respectively, and a separate lead 37 is connected between the terminal 38 of the contact arm 26 and the opposite side of the motor winding.

As shown in Figs. 3 and 4, the retaining lugs or trunnions 24 on the cover plate side flanges are located rearwardly of the center of the cover plate area where the outwardly acting spring pressure of the arm 27 is applied, and in order that the cover plate will normally stand level and square with upper part of the housing 2 a third retaining lug 39 is provided on the forward cover plate flange 20 to engage the downwardly facing shoulder formed by the inside bottom edge of the forward wall 40 of the motor section top opening. This lug 39 is in the form of a downwardly extending latch tongue projecting from the edge of the front cover flange 20, at substantially its center, and is provided with a forwardly projecting lip or catch 41, for latching engagement with the shoulder or edge of the wall 40, whereby the forward end of the cover plate will be limited in its outward movement under the pressure of the spring arm 27. The length of the tongue 39, however, is such that the bottom edge of the cover flange 20 will normally stand in vertically spaced relation with the shoulder 23, as shown in Fig. 3, so that limited inward movement of this end of the cover plate may be had as in the case of the side lugs 24.

It will now be seen that manual pressure on any part of the cover plate top surface will cause it to move bodily downward or inward, relative to the motor section of the housing 2, so as to depress the spring arm 27 sufficiently for its free end to engage the contact 30 on the switch arm 26. When the pressure is applied rearwardly of the center of the cover plate 17 the tongue and catch 39—41 will act as a fulcrum about which the cover will rock; and when the pressure is applied on the forward part of the cover plate the rounded lugs 24 will serve as trunnions about which the cover will pivot. In any case, the cover plate is thus not only securely held to the housing body or shell but is freely movable in any inward direction for operation of substantially any kind of momentary contact circuit closing means for controlling the motor operation.

As shown in Figs. 4, 5 and 7, sliding movement of the cover plate 17, in the fore and aft direction of the housing 2, is prevented by straight tongues 42 and 43, projecting downwardly from the front cover flange 20, on each side of the latching tongue 39, and seating in upwardly opening pockets or sockets 44 and 45 which are formed on the inside surface of the front wall 40 of the housing motor section. The tongues 42 and 43 are freely slidable up and down in the pockets 44 and 45 and the length of the tongues is such as to not interfere with the inward movement of the cover plate for operation of the contacting means 26—27.

The grinding wheel section 7 of the housing 2 is more or less of conventional form in which the top wall is of a height, above the motor shaft 4, slightly more than the radius of the grinding wheel 5. The wheel opening 8 extends from side to side of the housing and has downwardly and inwardly converging aprons 46 and 47 extending from each margin and from end to end of the opening. Also the aprons converge in the transverse direction of the housing so that the near-side opening, as seen in Figs. 1 and 2, is more narrow than the far-side opening and both side openings are considerably more narrow at their bottom than at their top. These aprons 46 and 47 serve as guiding surfaces against which a knife to be sharpened is rested as it is drawn along the side surfaces of the wheel 5 and the horizontal and vertical angles of these surfaces are preferably 5½ and 13 degrees respectively, from the vertical plane, so to provide the most desirable angle for the ground cutting edge of the knife. Also horizontal spring arms 48 and 49, mounted on a vertical column or post 50 at the far end of the opening 8, are provided to urge the knife blade against the aprons 46 and 47 and keep it from engaging the wheel 5 except along the cutting edge to be sharpened.

The buffing wheel section 9 of the housing 2 is stepped down from the section 7 so that its top wall will lie close to the motor shaft 4 and permit about one-third of the diameter of the buffing wheel 6 to project from the top opening 10. The width of this section, however, is the same as the width of the section 7, so that the far and near side walls of the two sections will lie in respective common planes, as shown in Fig. 2, and a sliding, inverted U-shaped cover or guard 51 is mounted on the housing 2 to cover one or the other of the wheels 5 and 6.

The cover 51 is made with a width sufficient to straddle the housing sections 7 and 9, and its legs 52 and 53 are each provided with an inturned foot 54 which slidably rests on a horizontal ledge or shoulder 55 at each side of the housing. The height of the cover 51 is made so as to be freely slidable over the grinding wheel section 7 and the length of the cover is substantially the same as the length of each housing section, 7 or 9. Thus, whenever one of the wheels is exposed or uncovered the other is enclosed by the cover 51, so that regardless of which wheel is being used the other is guarded against unintended contact with the user's hand.

As shown in Fig. 6, the sliding cover 51 is retained on the housing 2 by means of longitudinally spaced lugs 56 which project outwardly from the side walls of the housing sections 7 and 9, above the shoulders 55, and overhang the inturned feet 54. The lugs 56 slope downwardly from the respective sidewalls, so that the cover feet will cam past them when the cover is applied, and are spaced apart approximately one-half the length of the cover 51 so that the cover feet will be engaged by at least two lugs, on each side of the housing, regardless of its position along the shoulders 55. Also the transverse end wall 57, at the buffing wheel end of the housing, projects above the shoulders 55 to provide a stop for the endward movement of the sliding cover, movement in the opposite direction being limited by the motor casing portion of the unit housing 2.

It will now be seen that the improved housing or casing not only provides a more easily operable contact-actuating motor-section cover plate arrangement but also permits a unitary construction having both grinding wheel and buffing wheel sections which can be protected by a single sliding guard that automatically shields one of the wheels when the other is in use; and that the entire assembly comprises a compact unit which can be put together easily and with a minimum of labor cost, thus minimizing manufacturing cost.

Other particular advantages of this invention are to be found in the form and mounting arrangement of the floating motor-section cover plate whereby only a light inward pressure on any part of the cover area, in substantially any generally downward direction, as by merely resting the hand on the motor section of the housing, will result in operative engagement of the circuit closing contacts to start motor operation, and still further advantages are found in the construction of the cover plate and motor housing whereby the cover plate is attached to the housing, in spring-supported floating relation, by a simple snap-on engagement of self locking latching means which also function as fulcrum points or bearings for the various possible cover plate movements; and in the simple form and arrangement of the sliding wheel guard whereby it can be applied to the housing by a snap-on engagement which obviates the need for any attachment fittings or fixtures or the use of any tools.

Although but one specific embodiment of this invention is herein shown and described, it will be understood that numerous details of the construction shown may be altered or omitted without departing from the spirit of this invention as defined by the following claims.

I claim:

1. An electric appliance housing comprising a motor enclosure section having side walls and end walls and a top opening, said side walls each terminating in an inwardly projecting lip at its upper edge, a cover plate disposed in said top opening between said lips and having downwardly extending side flanges, spring means in said housing bearing upwardly on said cover plate at substantially the center of its area for normally urging said cover plate outwardly of said top opening, a laterally projecting trunnion on each of said cover plate side flanges for normally engaging the lower surfaces of said lips to resist the upwardly bearing action of said spring means, said trunnions being located between one end of said cover plate and the center of the area thereof, a downwardly facing shoulder extending between said side walls adjacent the other end of said cover plate, and downwardly projecting latch means on said other end of said cover plate normally engaging beneath said shoulder, said latch means being configured to afford pivotal movement of said plate and act as a fulcrum when pressure is exerted on the other side of the center of the plate from said latch means and said trunnions providing pivotal movement thereabout when pressure is exerted on the side of the said plate between said center and said latch means.

2. An electric appliance housing comprising a motor enclosure section having side walls and end walls defining a top opening, said side walls each terminating in an inwardly projecting lip at its upper edge, a cover plate having downwardly extending side flanges disposed in said top opening between said lips, spring means in said housing bearing upwardly on said cover plate at substantially the center of its area for normally urging said cover plate outwardly of said top opening, a laterally projecting trunnion on each of said cover plate side flanges for normally engaging the lower surfaces of said lips to resist the upwardly bearing action of said spring means, said trunnions being axially aligned and located between one end of said cover plate and the center of the area thereof, a downwardly facing shoulder extending between said side walls adjacent the other end of said cover plate, and a downwardly extending latch means on said other end of said cover midway between the side flanges thereof for latching engagement with said shoulder, said latch means being configured to afford pivotal movement of said plate and act as a fulcrum when pressure is exerted on the other side of the center of the plate from said latch means and said trunnions providing pivotal movement thereabout when pressure is exerted on the side of the said plate between said center and said latch means.

3. An electric appliance housing comprising a motor enclosure section having side walls and end walls and a top opening, said side walls each terminating in an inwardly projecting lip at its upper edge, a cover plate having downwardly extending side flanges, disposed in said top opening between said lips, spring means in said housing bearing upwardly on said cover plate at substantially the center of its area for normally urging said cover plate outwardly of said top opening, a laterally projecting trunnion on each of said cover plate side flanges for normally engaging the lower surfaces of said lips to resist the upwardly bearing action of said spring means, said trunnions being axially aligned and located between one end of said cover plate and the center of the area thereof, said trunnions having upwardly converging side surfaces for rockable engagement with said lips, a downwardly facing shoulder extending between said side walls adjacent the other end of said cover plate, and downwardly projecting latch means on said other end of said cover plate normally engaging beneath said shoulder, said latch means being configured to afford pivotal movement of said plate and act as a fulcrum when pressure is exerted on the other side of the center of the plate from said latch means and said trunnions providing pivotal movement thereabout when pressure is exerted on the side of the said plate between said center and said latch means.

4. An electric appliance housing comprising a motor enclosure section having side and end walls and a top opening, said side walls each terminating in an inwardly projecting lip at its upper edge, a cover plate having downwardly extending side flanges disposed in said top opening between said lips, spring means in said housing bearing upwardly on said cover plate at substantially the center of its area for normally urging said cover plate outwardly of said top opening, said spring means being yieldable for limited inward movement of said cover plate in said top opening, a laterally projecting trunnion on each of said cover plate side flanges for normally engaging the lower surfaces of said lips to resist the upwardly bearing action of said spring means, said trunnions being located between one end of said cover plate and the center of the area thereof, a downwardly facing shoulder extending between said side walls adjacent the other end of said cover plate, and downwardly projecting latch means on said other end of said cover plate normally engaging beneath said shoulder, said latch means being configured to afford pivotal movement of said plate and act as a fulcrum when pressure is exerted on the other side of the center of the plate from said latch means and said trunnions providing pivotal movement thereabout when pressure is exerted on the side of the said plate between said center and said latch means.

5. An electric appliance housing comprising a motor enclosure section having side and end walls and a top opening, said side walls each terminating in an inwardly projecting lip at its upper edge, a cover plate having downwardly extending side flanges disposed in said top opening between said lips, spring means in said housing bearing upwardly on said cover plate at substantially the center of its area for normally urging said cover plate outwardly of said top opening, a laterally projecting trunnion on each of said cover plate side flanges for normally engaging the lower surfaces of said lips to resist the upwardly bearing action of said spring means, said trunnions being located between one end of said cover plate and the center of the area thereof, a downwardly facing shoulder extending between said side walls adjacent the other end of said cover plate, downwardly projecting latch means on said other end of said cover plate and having an outward extension normally engaging beneath said shoulder and terminating thereunder, and momentary contact circuit closing means disposed beneath said cover plate for operation thereby upon inward movement thereof.

6. An electric appliance housing comprising a motor enclosure section having side walls and end walls and a top opening, said side walls each terminating in an inwardly projecting lip at its upper edge, a cover plate having downwardly extending side flanges disposed in said top opening between said lips, a cantilevered spring arm mounted in said housing and having its free end bearing upwardly on said cover plate at substantially the center of its area for normally urging said cover plate outwardly of said top opening, a laterally projecting trunnion on each of said cover plate side flanges for normally engaging the lower surfaces of said lips to resist the upwardly bearing action of said spring arm, said trunnions being located between one end of said cover plate and the center of the area thereof, a downwardly facing shoulder extending between said side walls adjacent the other end of said cover plate, downwardly projecting latch means on said other end of said cover plate normally engaging beneath said shoulder, and a contact means in said housing engageable with said spring arm upon inward movement of said cover plate, said spring arm and contact means being electrically conductive for closing a circuit when engaged with each other, said latch means being configured to afford pivotal movement of said plate and act as a fulcrum when pressure is exerted on the other side of the center of the plate from said latch means and said trunnions providing pivotal movement thereabout when pressure is exerted on the side of the said plate between said center and said latch means.

7. An electric appliance casing comprising a molded shell having a portion housing an electric motor and having a top opening therein, said opening being bounded on opposite sides by overhanging portions of said casing which provide downwardly facing shoulders, a cover plate disposed in said opening and having peripheral depending flanges extending below said shoulders, axially aligned trunnions projecting from said flanges to engage beneath said shoulders, the axis of said trunnions being eccentric with respect to the area center of said cover plate, spring means normally urging said cover plate outwardly of said opening and bearing upwardly on said plate at substantially the center of its area, said cover plate being bodily movable vertically in said opening against said spring means and pivotally swingable about the axis of said trunnions, means on said housing for limiting the inward vertical and pivoted movements of said cover plate in said opening, means on said cover plate at the remote end of a centerline normal to the axis of said trunnions for engaging said housing and limiting the outward movement of the cover plate thereat, and momentary contact means in said housing operable by said cover plate for closing a circuit to the motor upon inward movement of the same against said spring means, said latch means being configured to afford pivotal movement of said plate and act as a fulcrum when pressure is exerted on the other side of the center of the plate from said latch means and said trunnions providing pivotal movement thereabout when pressure is exerted on the side of the said plate between said center and said latch means.

8. An electric appliance motor housing comprising a shell having side and end walls and a substantially rectangular top opening, opposite sides of said opening being bounded by overhanging portions of said shell providing downwardly facing shoulders, a substantially rectangular cover plate disposed in said top opening and having downwardly extending side flanges projecting below said shoulders, axially aligned trunnions projecting laterally from said side flanges and engaging said shoulders, the axis of said trunnions being located between the center of the cover plate area and one end thereof, spring means in said housing bearing upwardly on said cover plate at substantially the center of its area, a downwardly facing shoulder on said housing at the other end of said cover plate, means on said other end of said cover plate for upwardly bearing latching engagement with the last mentioned shoulder, and contact means in said housing operable by inward movement of said cover plate for closing an electric circuit to a motor, said latch means being configured to afford pivotal movement of said plate and act as a fulcrum when pressure is exerted on the other side of the center of the plate from said latch means and said trunnions providing pivotal movement thereabout when pressure is exerted on the side of the said plate between said center and said latch means.

9. An electric appliance motor housing comprising a shell having side and end walls and a substantially rectangular top opening, opposite sides of said opening being bounded by overhanging portions of said shell providing downwardly facing shoulders, a substantially rectangular cover plate disposed in said top opening and having downwardly extending side flanges projecting below said shoulders, axially aligned trunnions projecting laterally from said side flanges and engaging said shoulders, the axis of said trunnions being located between the center of the cover plate area and one end thereof, a cantilevered spring arm mounted in said housing below said cover plate and having its free end extending angularly upward to engage said cover plate at substantially the center of its area and normally urge the same outwardly, a downwardly facing shoulder on said housing at the other end of said cover plate, means on said other end of said cover plate for upwardly bearing latching engagement with the last mentioned shoulder, and contact means in said housing engageable with said spring arm upon inward movement of said cover plate for closing an electric circuit to a motor, said latch means being configured to afford pivotal movement of said plate and act as a fulcrum when pressure is exerted on the other side of the center of the plate from said latch means and said trunnions providing pivotal movement thereabout when pressure is exerted on the side of the said plate between said center and said latch means.

10. An electric appliance motor housing comprising a shell having side and end walls and a substantially rectangular top opening bounded thereby, said side walls having inwardly projecting lips providing downwardly facing shoulders at the sides of said top opening, a rectangular cover plate mounted in said top opening and having downwardly projecting side and end flanges, axially aligned trunnions extending from said side flanges and engaged beneath said shoulders, the axis of said trunnions being located between the center of said cover plate and one end thereof, spring means in said housing for engaging said cover plate at substantially the center of its area and normally urging said cover plate upwardly in said opening, a downwardly facing shoulder on the housing end wall at the other end of said cover plate, downwardly projecting latch means on said other end of the cover plate for latching engagement beneath said end wall shoulder to limit upward movement of said other cover plate end, upwardly facing shoulders on each of said end walls engageable with the end flanges of said cover plate upon predetermined inward movement of the same, and contact means in said housing operable upon inward movement of said cover plate for closing an electric circuit to a motor, said latch means being configured to afford pivotal movement of said plate and act as a fulcrum when pressure is exerted on the other side of the center of the plate from said latch means and said trunnions providing pivotal movement thereabout when pressure is exerted on the side of the said plate between said center and said latch means.

11. An electric knife sharpener comprising a casing having a motor housing portion, a grinding wheel portion, and a buffing wheel portion, all arranged successively in axial alignment with a motor and motor shaft contained therein; said motor housing portion having a shiftable top wall disposed between opposite side walls and normally urged outwardly by an upwardly acting spring means mounted within the housing and bearing on the top wall at substantially the center of its area, said top wall being retained on said housing by axially aligned trunnions on the top wall engaged beneath downwardly facing shoulders on the housing side walls, and a latch means at one end of of the top wall engaging beneath an adjacent end wall shoulder, said trunnions being aligned on an axis located between the center of the top wall and its other end, and a momentary contact circuit closing means in said housing for said motor operable by inward manual movement of said top wall; and said grinding and buffing wheel portions having a shiftable cover member straddling the same and mounted on the casing for sliding movement longitudinally thereof, in abutting relation with said casing, said grinding and buffing wheel portions being of substantially the same length, and said cover member having a length substantially equal to one of said sections for covering either of said sections when the wheel of the other is in operation, said latch means being configured to afford pivotal movement of said plate and act as a fulcrum when pressure is exerted on the other side of the center of the plate from said latch means and said trunnions providing pivotal movement thereabout when pressure is exerted on the side of the said plate between said center and said latch means.

12. A unitary casing for an electric knife sharpener comprising a housing having a motor encasing portion, and a grinding wheel and buffing wheel portion, all arranged in horizontal alignment; said motor portion having a top opening bounded on opposite sides and at one end by portions of the housing wall which provide downwardly facing shoulders, said grinding and buffing wheel portion having parallel side walls extending upwardly from upwardly facing longitudinally extending base margins and said side walls having laterally projecting formations above said base margins providing downwardly facing shoulders spaced a predetermined distance from said base margins, a pair of movable covers, one for said motor portion and one for said grinding and buffing wheel portion, each of said covers having laterally projecting members for engaging beneath the shoulders bounding the respective housing portions, and each of said covers being of resiliently yieldable material and adapted for attachment to said housing by springing said projecting members into latching engagement with said shoulders by downward pressure, and upwardly acting yieldable spring means within said motor portion for supporting the cover thereof at substantially the center of its area and normally urging the cover outwardly against the respective shoulders whereby said cover is inwardly movable in said top opening, said grinding and buffing wheel portion cover being shiftable longitudinally on said base margins abutting relation with said side walls and shoulders thereon and having a length substantially one-half the length of said portions for exposing one-half thereof while covering the other half.

13. An electric appliance casing comprising a molded shell having a portion housing an electric motor and having a top opening therein, said opening being bounded on opposite sides by overhanging portions of said casings to provide downwardly facing shoulders, a cover plate disposed in said opening and having peripheral depending flanges extending below said shoulders, axially aligned trunnions projecting from said flanges to engage beneath said shoulders, the axis of said trunnions being eccentric with respect to the area of said cover plate, spring means normally urging said cover plate outwardly of said opening and bearing upwardly on said plate at substantially the center of the area, said cover plate being bodily movable vertically in said opening against said spring means and pivotally swingable about the axis of said trunnions, a shoulder formed on said cover plate at the remote end of a center line normal to the axis of said trunnions for limiting the inward vertical movements of said cover plate and said opening and a latch spaced vertically beneath said shoulder for engaging said housing and limiting the outward vertical movement of the cover plate, and contact means in said housing operable by said cover plate for closing a circuit to the motor upon inward movement of the same against said spring means, said latch means being configured to afford pivotal movement of said plate and act as a fulcrum when pressure is exerted on the other side of the center of the plate from said latch means and said trunnions providing pivotal movement thereabout when pressure is exerted on the side of the said plate between said center and said latch means.

14. An electric appliance casing comprising a molded shell having a portion housing an electric motor and having a top opening therein, said opening being bounded on opposite sides by overhanging portions of said casings to provide downwardly facing shoulders, a cover plate disposed in said opening and having peripheral depending flanges extending below said shoulders, axially aligned trunnions projecting from said flanges to engage beneath said shoulders, the axis of said trunnions being eccentric with respect to the area of said cover plate, spring means normally urging said cover plate outwardly of said opening and bearing upwardly on said plate at substantially the center of the area, said cover plate being bodily movable vertically in said opening against said spring means and pivotally swingable about the axis of said trunnions, a shoulder formed on said cover plate at the remote end of a center line normal to the axis of said trunnions for limiting the inward vertical movements of said cover plate and said opening and a latch spaced vertically beneath said shoulder for engaging said housing and limiting the outward vertical movement of the cover plate, said housing providing shoulder means on all sides of said cover for limiting the inward movement of said cover plate, and contact means in said housing operable by said cover plate for closing a circuit to the motor upon inward movement of the same against said spring means, said latch means being configured to afford pivotal movement of said plate and act as a fulcrum when pressure is exerted on the other side of the center of the plate from said latch means and said trunnions providing pivotal movement thereabout when pressure is exerted on the side of the said plate between said center and said latch means.

(References on following page)

References Cited in the file of this patent

UNITED STATES PATENTS

| | | |
|---|---|---|
| 175,497 | Ramlose | Mar. 28, 1876 |
| 2,220,425 | Potter | Nov. 5, 1940 |
| 2,497,643 | Waterman | Feb. 14, 1950 |
| 2,550,250 | Huppert | Apr. 24, 1951 |
| 2,655,067 | Bechler | Oct. 13, 1953 |
| 2,673,914 | Sundt | Mar. 30, 1954 |
| 2,775,075 | McMaster et al. | Dec. 25, 1956 |

FOREIGN PATENTS

| | | |
|---|---|---|
| 981,178 | France | Jan. 10, 1951 |